(12) United States Patent
Chu et al.

(10) Patent No.: US 11,535,224 B2
(45) Date of Patent: Dec. 27, 2022

(54) HEAVY VEHICLE BRAKE CONTROL DEVICE AND METHOD THEREOF

(71) Applicant: Industrial Technology Research Institute, Hsinchu (TW)

(72) Inventors: Kao-Hone Chu, Kaohsiung (TW); Jyh-Chun Chang, New Taipei (TW); Tsu-Yang Tsai, Kaohsiung (TW); Yi-Lun Cheng, Taichung (TW); Jia-Cheng Ke, Hsinchu (TW); Shih-Ming Lo, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 144 days.

(21) Appl. No.: 17/134,896

(22) Filed: Dec. 28, 2020

(65) Prior Publication Data

US 2022/0089138 A1    Mar. 24, 2022

(30) Foreign Application Priority Data

Sep. 21, 2020 (TW) ................................ 109132618

(51) Int. Cl.
*B60T 13/68* (2006.01)
*B60T 13/66* (2006.01)
*B60T 17/22* (2006.01)

(52) U.S. Cl.
CPC .......... *B60T 13/683* (2013.01); *B60T 13/662* (2013.01); *B60T 17/22* (2013.01); *B60T 2270/402* (2013.01)

(58) Field of Classification Search
CPC ...... B60T 13/683; B60T 17/22; B60T 13/662; B60T 2270/402
See application file for complete search history.

(56) References Cited

U.S. PATENT DOCUMENTS 9,776,607 B2    10/2017    Brenn et al.
10,167,015 B2    1/2019    Rust et al.
(Continued)

FOREIGN PATENT DOCUMENTS

CN    2464590 Y    12/2001
CN    107697048 A    2/2018
(Continued)

OTHER PUBLICATIONS

TW OA issued on Mar. 25, 2021.
(Continued)

*Primary Examiner* — Pamela Rodriguez
(74) *Attorney, Agent, or Firm* — WPAT, PC

(57) ABSTRACT

A heavy vehicle brake control method includes: activating two electro-pneumatic proportional valve control modules to perform braking along a front-axle electrical brake loop and a rear-axle electrical brake loop, respectively; while the two electro-pneumatic proportional valve control modules perform braking along the front-axle electrical brake loop and the rear-axle electrical brake loop, judging malfunctions by detecting the two electro-pneumatic proportional valve control modules; if none of the malfunctions is detected, the two electro-pneumatic proportional valve control modules continuing to perform braking along the front-axle electrical brake loop and the rear-axle electrical brake loop; and, if one or more malfunctions are detected, then switching on a brake-pedal cable control module to control the brake pedal of the brake valve to perform braking. In addition, a heavy vehicle brake control device is also provided.

6 Claims, 8 Drawing Sheets

(56) References Cited

U.S. PATENT DOCUMENTS

| | | |
|---|---|---|
| 10,189,456 B2 | 1/2019 | Foitzik et al. |
| 10,328,918 B2 | 6/2019 | Howell |
| 10,486,665 B2 | 11/2019 | Tanimoto |
| 10,611,348 B2 | 4/2020 | Zipfel et al. |
| 10,710,565 B2 * | 7/2020 | Egnor ................ B60T 8/17 |
| 11,124,166 B2 * | 9/2021 | Tanaka ............... B60T 11/28 |
| 2020/0010060 A1 * | 1/2020 | Tanaka ............... B60T 17/18 |

FOREIGN PATENT DOCUMENTS

| | | |
|---|---|---|
| CN | 110352151 A | 10/2019 |
| CN | 111361493 A | 7/2020 |
| TW | I238133 | 8/2005 |
| TW | I603871 | 11/2017 |
| TW | M555305 | 2/2018 |
| TW | I663086 | 6/2019 |
| TW | M581545 | 8/2019 |
| TW | I692423 | 5/2020 |
| WO | WO2018/130482 A1 | 7/2018 |

OTHER PUBLICATIONS

Mujie You et al., "Characteristics Analysis and Control Study of A Pneumatic Proportional Valve", 2015, IEEE.

Yang Fei et al., "Dynamic Characteristics of the Solenoid Valve in Air Brake System", 2015, International Conference on Fluid Power and Mechatronics.

S. Mithun et al., "Modeling and simulation of pneumatic brake system used in heavy commercial vehicle", Jan. 2014, pp. 01-09, vol. 11, Issue 1 Ver. II, IOSR Journal of Mechanical and Civil Engineering (IOSR-JMCE).

Bendix, "The Air Brake Handbook", 2014, Bendix Commercial Vehicle Systems LLC.

WABCO, "Systems And Components In Commercial Vehicles", 2014, WABCO.

WABCO, "Pneumatic Brake Equipment for Trailer Vehicles", 2018, WABCO Europe BVBA.

Chen, Chien-An, "Electronic auxiliary system of pneumatic braking", Feb. 2018, ARTC.

* cited by examiner

HEAVY VEHICLE BRAKE CONTROL DEVICE AND METHOD THEREOF

CROSS REFERENCE TO RELATED APPLICATION

This application claims the benefits of Taiwan application Serial No. 109132618, filed on Sep. 21, 2020, the disclosures of which are incorporated by references herein in its entirety.

TECHNICAL FIELD

The present disclosure relates in general to a heavy vehicle brake control device and a method thereof.

BACKGROUND

Currently, most of heavy vehicles, such as passenger buses or cargo trucks, are equipped with pneumatic brake systems. In a conventional pneumatic brake system, the entire pneumatic brake loop includes a front-axle brake loop, a rear-axle brake loop and a parking brake loop. In particular, the parking brake loop can be automatically activated upon when the air pressure of the brake system is insufficient. Generally, a driver treads a brake pedal of a brake valve to provide a specific brake force to control braking of vehicle.

In pace with the development of autonomous vehicle technology, conventional heavy vehicles might be retrofitted to active or autonomous vehicles. However, while in retrofitting the conventional heavy vehicle with the original autonomous brake system, a pretty high replacement cost can be expected.

Thus, a resort for resolving the aforesaid problems would be urgent in the art.

SUMMARY

An object of the present disclosure is to provide a heavy vehicle brake control device and a method thereof, which is a low-cost solution for active or autonomous brake control. While a primary brake control is in an abnormal situation, the heavy vehicle brake control device can also provide backup brake control of safety to greatly improve control safety of a pneumatic brake in the active or autonomous brake system.

In one embodiment of this disclosure, a heavy vehicle brake control device is applied to a heavy vehicle pneumatic brake system including main parts having at least a brake valve, a front-axle air reservoir, a front-axle brake module, a rear-axle air reservoir and a rear-axle brake module. The heavy vehicle brake control device includes a first electro-pneumatic proportional valve control module, a secondary electro-pneumatic proportional valve control module, a brake-pedal cable control module and an electronic control unit. The main parts for a front-axle electrical brake loop include the front-axle air reservoir, the brake valve, the first electro-pneumatic proportional valve control module and the front-axle brake module. A primary supply port of the brake valve and a module air inlet of the first electro-pneumatic proportional valve control module in parallel are connected to an outlet of the front-axle air reservoir. A primary delivery port of the brake valve is connected to a module-to-brake-valve inlet of the first electro-pneumatic proportional valve control module. A module air outlet of the first electro-pneumatic proportional valve control module is connected to the front-axle brake module. The first electro-pneumatic proportional valve control module can be alternately switched to control the front-axle electrical brake loop by the brake valve or the electro-pneumatic proportional valve. The main parts for a rear-axle electrical brake loop include the rear-axle air reservoir, the brake valve, the secondary electro-pneumatic proportional valve control module and the rear-axle brake module. A secondary supply port of the brake valve and an air inlet of the secondary electro-pneumatic proportional valve control module in parallel are connected to an outlet of the rear-axle air reservoir. A secondary delivery port of the brake valve is connected to the module-to-brake-valve inlet of the secondary electro-pneumatic proportional valve control module. A module air outlet of the secondary electro-pneumatic proportional valve control module is connected to the rear-axle brake module. The secondary electro-pneumatic proportional valve control module can be alternately switched to control the rear-axle electrical brake loop by the brake valve or the electro-pneumatic proportional valve. The brake-pedal cable control module is connected with a brake pedal of the brake valve. The electronic control unit is connected with the first electro-pneumatic proportional valve control module, the secondary electro-pneumatic proportional valve control module and the brake-pedal cable control module. The electronic control unit controls activation of the first electro-pneumatic proportional valve control module and the secondary electro-pneumatic proportional valve control module to perform braking along the front-axle electrical brake loop and the rear-axle electrical brake loop, respectively, and judges malfunctions by detecting the first electro-pneumatic proportional valve control module and the secondary electro-pneumatic proportional valve control module so as to determine whether or not braking of the brake-pedal cable control module should be performed.

In another embodiment of this disclosure, a heavy vehicle brake control method includes the steps of: in the electrical braking mode, the electronic control unit activating two electro-pneumatic proportional valve control modules to perform braking along a front-axle electrical brake loop and a rear-axle electrical brake loop, respectively; in a brake step of the two electro-pneumatic proportional valve control modules, malfunctions being judged by detecting the two electro-pneumatic proportional valve control modules; if none of the malfunctions is detected, the two electro-pneumatic proportional valve control modules continuing to perform braking along the front-axle electrical brake loop and the rear-axle electrical brake loop, respectively; and, if one or more malfunctions are detected, a brake-pedal cable control module being selected to control the brake pedal of the brake valve to perform braking.

As stated above, the heavy vehicle brake control device and the method thereof provided in this disclosure apply the electrical brake device technology of two (first and secondary) electro-pneumatic proportional valve control modules and an electronic control unit. Namely, a conventional pneumatic brake system of a heavy vehicle is retrofitted with the electrical brake control device to equip the heavy vehicle with both the active or autonomous brake control and a manual braking. Thereupon, the low-cost active or autonomous brake control solution can be provided.

In addition, besides a malfunction detection mechanism of the electro-pneumatic control loop in the active or autonomous brake system, this disclosure further provides a brake-pedal cable control module as a mechanism for backing up the brake control safely. Thus, a brake control mechanism with dual protection for pneumatic braking in this disclosure can greatly improve control safety of the pneumatic brake in the active or autonomous brake system.

The detailed description and specific examples are given in the embodiments of the disclosure for illustration and explanations only, and additional changes and modifications in the preferred embodiments of the disclosure within the spirit and scope of the disclosure will become apparent to those skilled in the art.

BRIEF DESCRIPTION OF THE DRAWINGS

The present disclosure will become more fully understood from the detailed description of the embodiment given herein below with the accompanying drawings, wherein.

DETAILED DESCRIPTION

The following description of the embodiment of the disclosure with the accompanying drawings and the specific examples merely explains more clearly about the technical solution of the present disclosure and is in no way intended to limit the scope of the disclosure. In the following detailed description of the embodiments, the predicates of "first" and "secondary" are used to describe the exemplary components, and not intended to limit these components. In addition, these illustrations in the accompanying drawings are expressed in simplified or general-purpose manner to clearly describe the embodiments of the disclosure for the persons skilled in the art to understand. As recognized, additional modifications and changes can be made to the embodiments of the present disclosure without departing from the scope of the present disclosure.

Figure 1:
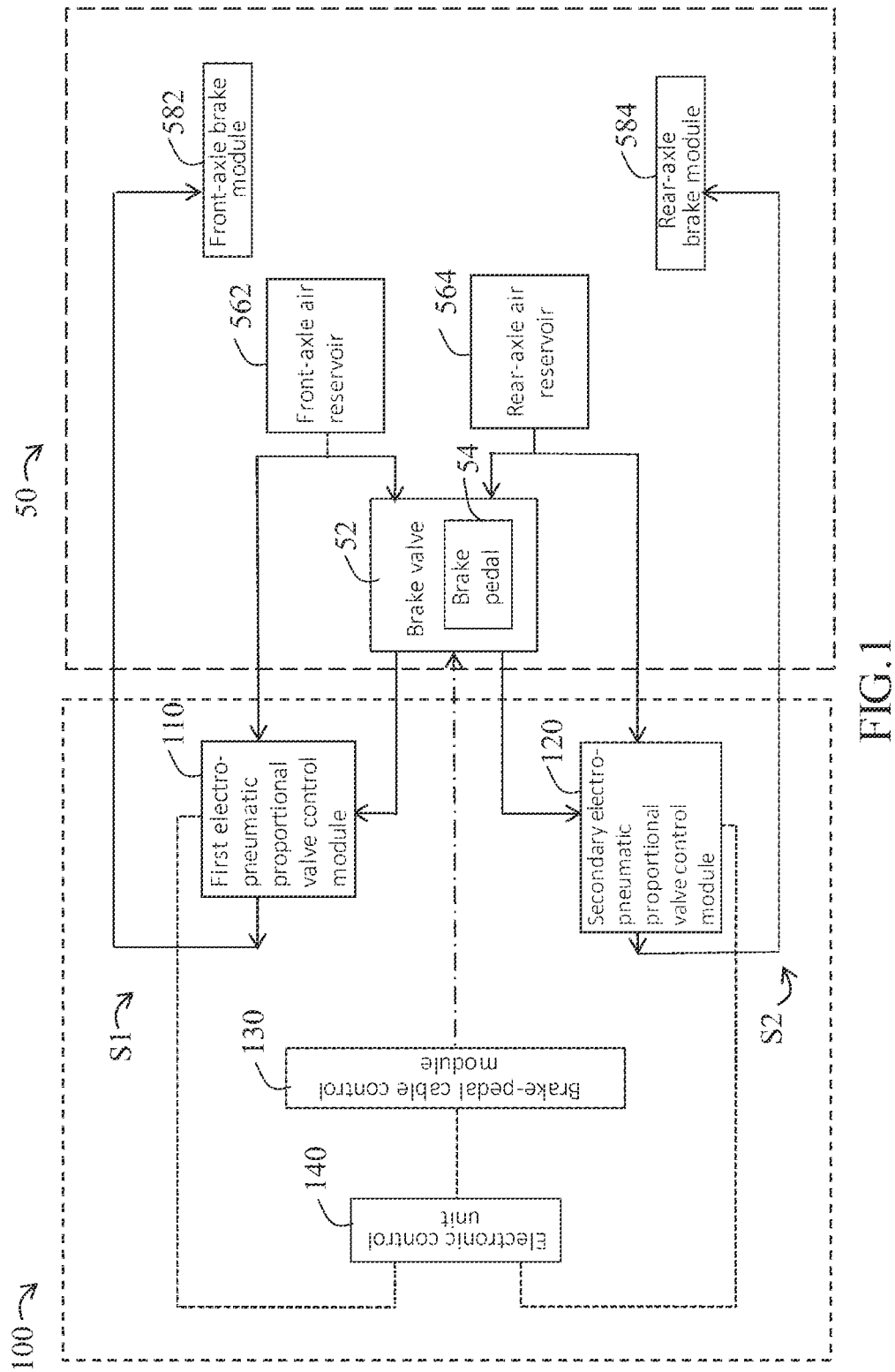
FIG. 1 is a schematic diagram for a heavy vehicle brake control device in accordance with this disclosure.

Referring to FIG. 1, a schematic diagram for a heavy vehicle brake control device in accordance with this disclosure is shown. In this embodiment, the heavy vehicle brake control device 100 is applicable for any electrical brake system of a heavy vehicle such as a passenger bus or a cargo truck. In particular, the heavy vehicle brake control device 100 is applied to a conventional heavy-vehicle pneumatic brake system 50 including main parts having at least a brake valve 52, a front-axle air reservoir 562, a front-axle brake module 582, a rear-axle air reservoir 564 and a rear-axle brake module 584. The brake valve 52 is connected between the front-axle air reservoir 562 and the front-axle brake module 582, and also connected between the rear-axle air reservoir 564 and the rear-axle brake module 584. The heavy vehicle brake control device 100 includes a first electro-pneumatic proportional valve control module 110, a secondary electro-pneumatic proportional valve control module 120, a brake-pedal cable control module 130 and an electronic control unit 140.

In this embodiment, the brake valve 52 is generally combined with the brake pedal 54, and the type of the brake valve 52 can be determined according to application requirements. Generally, the brake valve 52 can be composed of a housing, a piston assembly, a return spring assembly, a valve assembly, a primary air supply port, a primary air delivery port, a secondary air supply port and a secondary delivery port. The brake pedal 54 can be depressed to move the piston to regulate the air pressure delivered to primary/secondary delivery air circuits, or the brake pedal 54 can be released to cease delivery of the air. In this way, the high-pressure air of the air reservoir, regulated by the brake valve, can be delivered to the air brake actuators to implement the brake function of the vehicle.

In this embodiment, the primary supply port of the brake valve 52 and the module air inlet PO1 of the first electro-pneumatic proportional valve control module 110 in parallel are connected with the outlet of the front-axle air reservoir 562. The primary delivery port of the brake valve 52 is connected with the module-to-brake-valve inlet PO3 of the first electro-pneumatic proportional valve control module 110, and the module air outlet PO2 of the first electro-pneumatic proportional valve control module 110 is connected with the front-axle brake module 582. Namely, the front-axle electrical brake loop S1 of this embodiment is composed of the front-axle air reservoir 562, the brake valve 52, the first electro-pneumatic proportional valve control module 110 and the front-axle brake module 582.

In this embodiment, the secondary supply port of the brake valve 52 and the module air inlet of the secondary electro-pneumatic proportional valve control module 120 in parallel are connected with the outlet of the rear-axle air reservoir 564. The secondary delivery port of the brake valve 52 is connected with the module-to-brake-valve inlet of the secondary electro-pneumatic proportional valve control module 120, and the module air outlet of the secondary electro-pneumatic proportional valve control module 120 is connected with the rear-axle brake module 584. Namely, the rear-axle electrical brake loop S2 of this embodiment is composed of the rear-axle air reservoir 564, the brake valve 52, the secondary electro-pneumatic proportional valve control module 120 and the rear-axle brake module 584.

In this embodiment, the brake-pedal cable control module 130 is connected with the brake pedal 54 of the brake valve 52. The electronic control unit 140 is connected with the first electro-pneumatic proportional valve control module 110, the secondary electro-pneumatic proportional valve control module 120 and the brake-pedal cable control module 130.

Upon such an arrangement, the electronic control unit 140 in an electrical braking mode would activate the first electro-pneumatic proportional valve control module 110 and the secondary electro-pneumatic proportional valve control module 120 to perform braking along the front-axle electrical brake loop S1 and the rear-axle electrical brake loop S2, respectively, and also judge the malfunctions by detecting the first electro-pneumatic proportional valve control module 110 and the secondary electro-pneumatic proportional valve control module 120 so as to determine whether to switch to the brake-pedal cable control module 130 as needed. If none of the malfunctions is detected, the first electro-pneumatic proportional valve control module 110 and the secondary electro-pneumatic proportional valve control module 120 would continue to perform the braking along the front-axle electrical brake loop S1 and the rear-axle electrical brake loop S2, respectively. Otherwise, if one or more malfunctions are detected, then the brake-pedal cable control module 130 would determine to switch on to control the brake pedal 54 of the brake valve 52 to perform backup brake control of safety. Consequently, the electrical brake device technology of two electro-pneumatic proportional valve control modules (i.e., the first electro-pneumatic proportional valve control module 110 and the secondary electro-pneumatic proportional valve control module 120) and the electronic control unit 140 are applied in this embodiment. Namely, a conventional pneumatic brake system of a heavy vehicle is retrofitted with the electrical brake control device to equip the heavy vehicle with the active or autonomous brake control. Also, besides the malfunction detection mechanism of the electro-pneumatic control loop of the active or autonomous brake system, this embodiment further provides a brake-pedal cable control module 130 as a mechanism for the backup brake control of safety. Thus, the brake control mechanism with dual protection for pneumatic braking in this disclosure can greatly improve control safety of the pneumatic brake in the active or autonomous brake system.

Figures 2A, 2B:
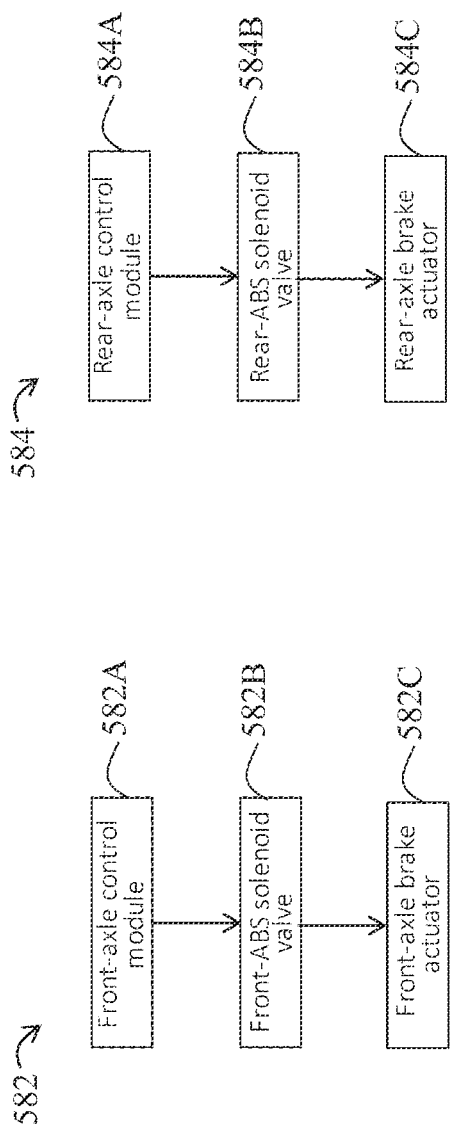
FIG. 2A is a schematic diagram of an embodiment of the front-axle brake module of FIG. 1.
FIG. 2B is a schematic diagram of an embodiment of the rear-axle brake module of FIG. 1.

FIG. 2A is a schematic diagram of an embodiment of the front-axle brake module of FIG. 1, and FIG. 2B is a schematic diagram of an embodiment of the rear-axle brake module of FIG. 1. Referring to FIG. 1, FIG. 2A and FIG. 2B, the front-axle brake module 582 of FIG. 2A is composed of a front-axle control module 582A, a front-ABS (Anti-locking brake system) solenoid valve 582B and a front-axle brake actuator 582C; and the rear-axle brake module 584 of FIG. 2B is composed of a rear-axle control module 584A, a rear-ABS solenoid valve 584B and a rear brake actuator 584C.

Figure 3:
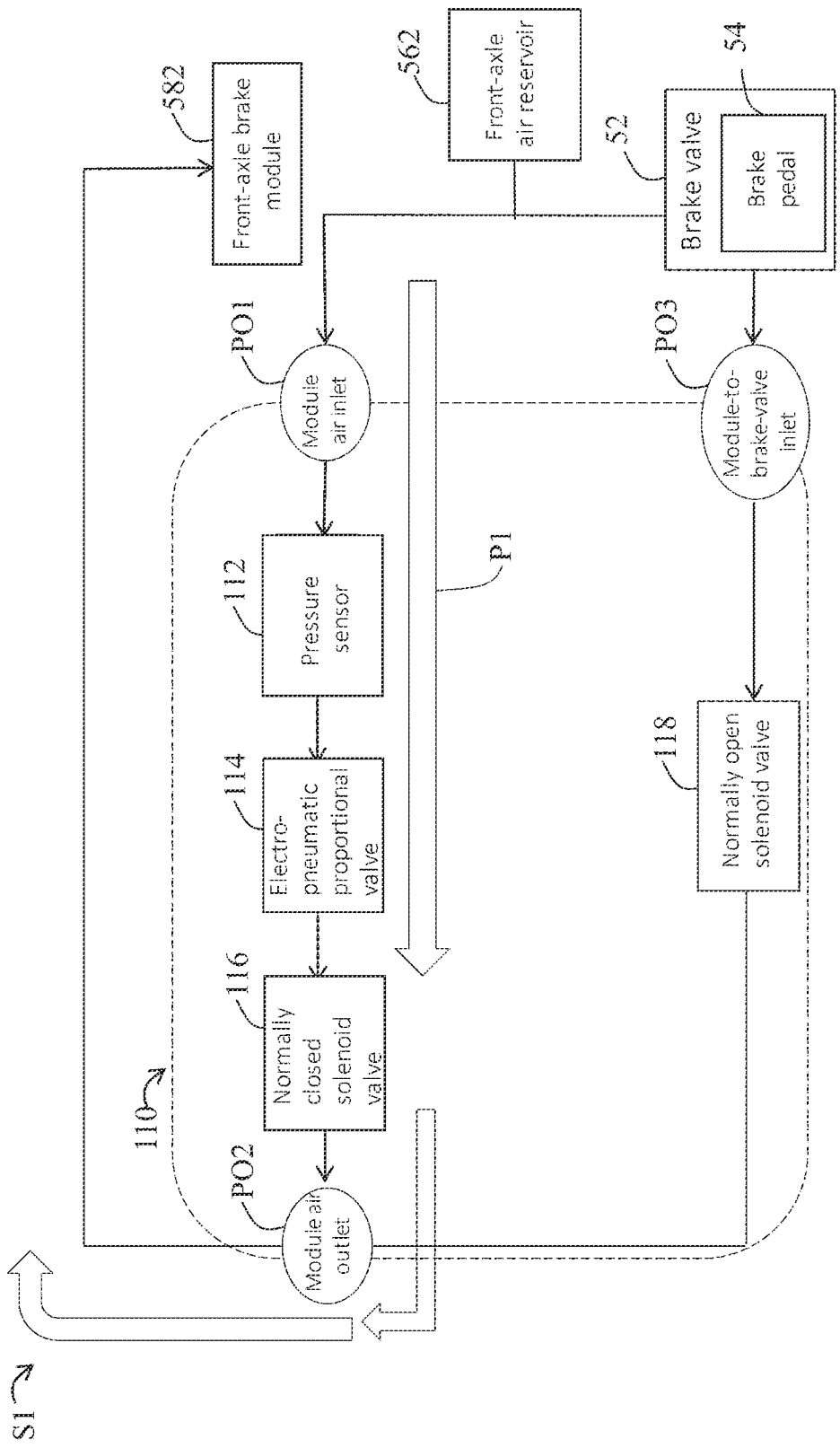
FIG. 3 is a schematic diagram of an embodiment of the first electro-pneumatic proportional valve control module switched to the electro-pneumatic proportional valve loop in FIG. 1.
Figure 4:
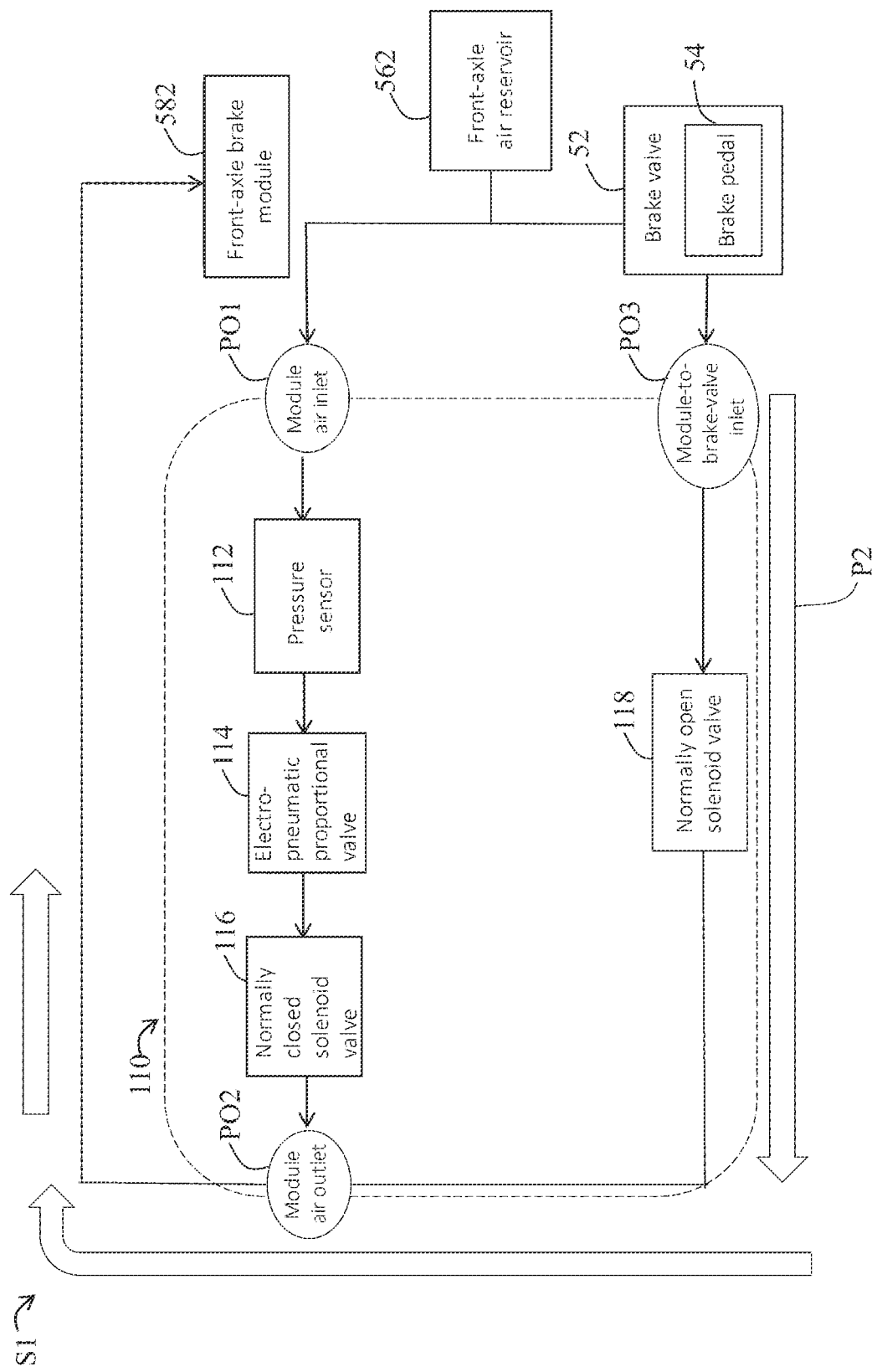
FIG. 4 is a schematic diagram of an embodiment of the first electro-pneumatic proportional valve control module switched to the brake valve loop in FIG. 1.

In this embodiment, the first electro-pneumatic proportional valve control module 110 can be alternately switched to control the front-axle electrical brake loop S1 by the brake valve 52 or the electro-pneumatic proportional valve 114 of the first electro-pneumatic proportional valve control module 110. Similarly, the secondary electro-pneumatic proportional valve control module 120 can be alternately switched to control the rear-axle electrical brake loop S2 by the brake valve 52 or the electro-pneumatic proportional valve of the secondary electro-pneumatic proportional valve control module 120. Actually, the arrangement of the first electro-pneumatic proportional valve control module 110 is similar to that of the secondary electro-pneumatic proportional valve control module 120 in FIG. 1, and the first electro-pneumatic proportional valve control module 110 is used as an exemplary module in FIG. 3 and FIG. 4. The first electro-pneumatic proportional valve control module in FIG. 1 being alternately switched to control by the electro-pneumatic proportional valve loop is shown in FIG. 3, and the first electro-pneumatic proportional valve control module in FIG. 1 being alternately switched to control by the brake valve loop is shown in FIG. 4. Referring to FIG. 1, FIG. 3 and FIG. 4, the first electro-pneumatic proportional valve control module 110 is composed of a pressure sensor 112, an electro-pneumatic proportional valve 114, a normally closed solenoid valve 116 and a normally open solenoid valve 118. Physically, the pressure sensor 112, the electro-pneumatic proportional valve 114 and the normally closed solenoid valve 116 are connected in order as an air circuit. The inlet of the pressure sensor 112 acts as the module air inlet PO1, connected with the outlet of the front-axle air reservoir 562, and the outlets of the normally closed solenoid valve 116 and the normally open solenoid valve 118 are connected together as the module air outlet PO2, connected with the front-axle brake module 582, and the inlet of the normally open solenoid valve 118 acts as the module-to-brake-valve inlet PO3, connected with the primary delivery port of the brake valve 52. Similarly, the arrangement, description and illustration of the secondary electro-pneumatic proportional valve control module 120 are similar to those shown in FIG. 3 and FIG. 4.

In one embodiment, the normally closed solenoid valve 116 and the normally open solenoid valve 118 in the first electro-pneumatic proportional valve control module 110 are energized as shown in FIG. 3, thus the normally open solenoid valve 118 would be energized to close the valve, and so the pressurized air from the primary delivery port of the brake valve 52 cannot flow through the normally open solenoid valve 118. Meantime, the normally closed solenoid valve 116 would be energized to open the valve, and so the pressurized air from the outlet of the front-axle air reservoir 562 would flow through the pressure sensor 112, the first electro-pneumatic proportional valve 114 and the normally closed solenoid valve 116, called integrally as the circuit of the electro-pneumatic proportional valve loop P1, to enable the front-axle brake module 582. Further, the pressure sensor 112 in the first electro-pneumatic proportional valve control module 110 would detect the air pressure of the outlet of the front-axle air reservoir 562, and the electro-pneumatic proportional valve 114 can detect the outlet air pressure itself. According to a brake command from a supervisory controller, the electronic control unit 140 would control the flow rate of the electro-pneumatic proportional valve so as to perform corresponding electro-pneumatic braking. During the brake steps, compare and evaluate the outlet air pressure of the front-axle air reservoir 562, the target outlet air pressure corresponding to the flow rate of the electro-pneumatic proportional valve 114, the measured outlet air pressure of the electro-pneumatic proportional valve 114 and the derived vehicle deceleration, and then judge whether the electro-pneumatic proportional valve module works normally according to the evaluation results. If abnormal, then switch to the brake-pedal cable control module 130 to control the brake pedal of brake valve to perform braking.

Figure 5:
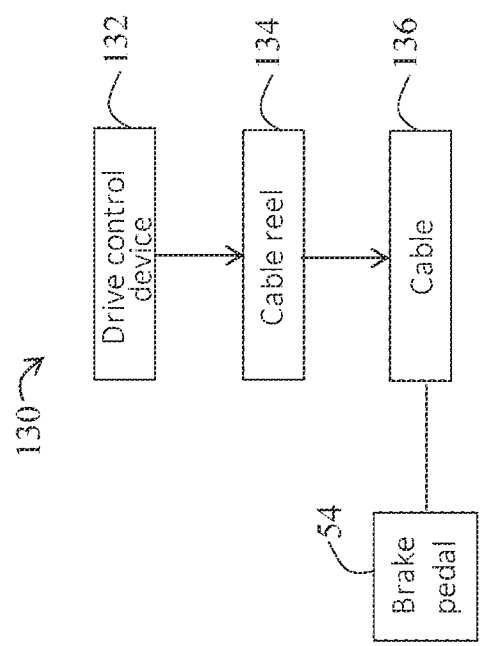
FIG. 5 is a schematic diagram of an embodiment of the brake-pedal cable control module of FIG. 1.

In another embodiment, the normally closed solenoid valve 116 and the normally open solenoid valve 118 of the first electro-pneumatic proportional valve control module 110 are de-energized as shown in FIG. 4, thus the normally closed solenoid valve 116 would be de-energized to close the valve, and so the pressurized air from the outlet of the front-axle air reservoir 562 cannot flow through the first electro-pneumatic proportional valve loop P1. Meantime, the normally open solenoid valve 118 would be de-energized to open the valve, and so the pressurized air from the outlet of the front-axle air reservoir 562 would flow through the brake valve 52 and the normally open solenoid valve 118, called as the circuit of the brake valve loop P2, to enable the front-axle brake module 582, and simultaneously the brake-pedal cable brake module 130 is switched to operate together. As shown in FIG. 5, the brake-pedal cable control module 130 is composed of a drive control device 132, a cable reel 134 and a cable 136, in which the drive control device 132 includes a motor module with an absolute position sensor and a motor control unit with position control function. In this embodiment, the arrangement of the brake-pedal cable control module 130 can be adapted according to application requirements. In this arrangement, the cable 136 is connected with the brake pedal 54 of the brake valve 52, and the drive control device 132 controls the cable reel 134 to the desired rotational angle. Then, the brake pedal 54 is pulled by the cable 136 to reach the desired stroke depth in the brake valve so as to achieve a specific braking function.

Figure 6:
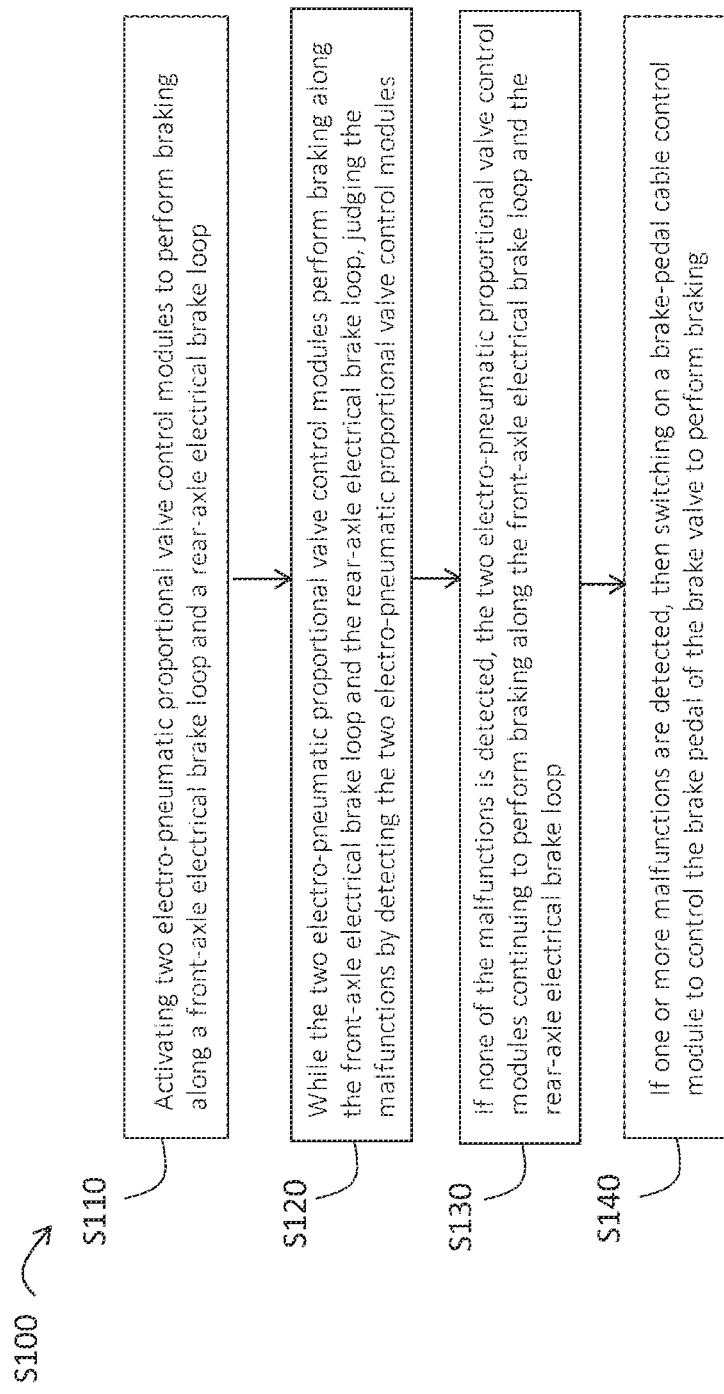
FIG. 6 is a flow diagram of the heavy vehicle brake control method of an embodiment in accordance with this disclosure.

FIG. 6 is a flow diagram of an embodiment of the heavy vehicle brake control method in accordance with this disclosure. Referring to FIG. 1 through FIG. 6, the heavy vehicle brake control method S100 of this disclosure is implemented according to the heavy vehicle brake control device 100 as shown from FIG. 1 to FIG. 5, and includes the steps S110 to S140.

In Step S110 at first, the two electro-pneumatic proportional valve control modules (i.e., the first electro-pneumatic proportional valve control module 110 and the secondary electro-pneumatic proportional valve control module 120 of FIG. 1) are activated to perform braking along the front-axle electrical brake loop S1 and the rear-axle electrical brake loop S2, respectively. The arrangements and the functions of the first electro-pneumatic proportional valve control module 110 and the secondary electro-pneumatic proportional valve control module 120 are described as above and thus would not be repeated herein.

In Step S120, while the two electro-pneumatic proportional valve control modules perform braking along the front-axle electrical brake loop S1 and the rear-axle electrical brake loop S2, respectively, malfunctions judgment can be realized by detecting the two electro-pneumatic proportional valve control modules. The detection steps of the Step S120 are explained in detail as follows. Firstly, measure the air pressure of the module air inlet (i.e., the air pressure at the outlet of the air reservoir) by the pressure sensor, and compare it with the nominal air pressure. If the air pressure is too low, the parking brake would be activated, and the driver would be alerted to perform a manual brake. Then, if the air pressure is normal, the electronic control unit 140 would control the flow rate of the electro-pneumatic proportional valve according to the brake command from a supervisory controller, and thus a corresponding electro-pneumatic outlet pressure would be regulated to perform the electro-pneumatic braking. Also, the electronic control unit 140 derives the vehicle deceleration from the vehicle speed information. Then, the electronic control unit 140 would judge the malfunctions by comparing and evaluating the outlet air pressure of the air reservoir, the measured electro-pneumatic outlet air pressure and the target electro-pneumatic outlet air pressure corresponding to the flow rate and the derived vehicle deceleration. Correspondingly, if the measured electro-pneumatic outlet air pressure and the derived vehicle deceleration are compared to locate an abnormality, then a malfunction is determined. In case that the electro-pneumatic proportional valve is set by 40% of the full flow rate according to a brake command, and the corresponding target air pressure of outlet would be 4 bar. Then, as expected, the measured electro-pneumatic outlet air pressure should be within the range of 4 bar and the derived vehicle deceleration from the vehicle speed information should be within the deceleration range of the brake command. If the results are evaluated to be invalid, then the brake control loop of the electro-pneumatic proportional valve is judged to be abnormal.

Then, in the Step S130, if none of the malfunctions is detected, the two electro-pneumatic proportional valve control modules would continue to perform braking along the front-axle electrical brake loop S1 and the rear-axle electrical brake loop S2, respectively.

Then, in Step S140, if one or more malfunctions are detected in the two electro-pneumatic proportional valve control modules, then the brake-pedal cable control module 130 is switched on to control the brake pedal 54 to perform braking. Thus, besides the malfunction detection mechanism of the electro-pneumatic control loop of the active or autonomous brake system, this embodiment further provides a brake-pedal cable control module as a mechanism for backing up the brake control of safety. Hence, the brake control mechanism with dual protection for pneumatic braking in this disclosure can greatly improve safety of the pneumatic brake in the active or autonomous brake system.

Figure 7:
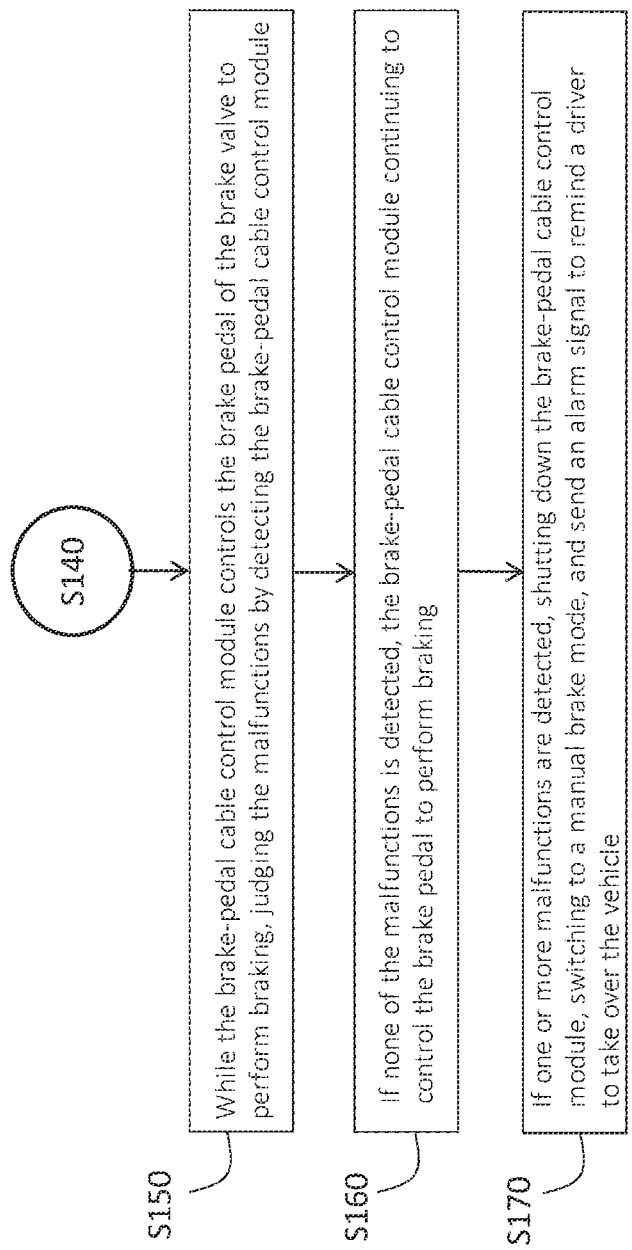
FIG. 7 is a flow diagram of the extension of the heavy vehicle brake control method shown in FIG. 6.

In an extension of the embodiment, FIG. 7 shows a flow diagram of an extension in the embodiment of the heavy vehicle brake control method of FIG. 6. Refer to FIG. 1 through FIG. 7, in which FIG. 7 as an extension of the Step S140 of FIG. 6 includes Step S150 to Step S170. In Step S150, while the brake-pedal cable control module controls the brake pedal to perform braking, the malfunctions are judged by detecting the brake-pedal cable control module 130. Among all the detections, following examples might be met. For example, the drive control device 132 might be detected as invalid, the cable 136 might not be stretched correctly to prevent the brake pedal 54 from being pulled to achieve the stroke depth as expected, or the derived vehicle deceleration might be out of the brake command value. Any of the aforesaid detections can be used to judge a corresponding malfunction of the brake-pedal cable control module 130.

In Step S160, if none of the malfunction is detected, the brake-pedal cable control module 130 would continue to control the brake pedal to perform braking. In contrast, in Step S170, if one or more malfunction are detected, thus the brake-pedal cable control module 130 would be shut down to stop the autonomous brake, and simultaneously the manual brake mode would take over the vehicle.

Figure 8:
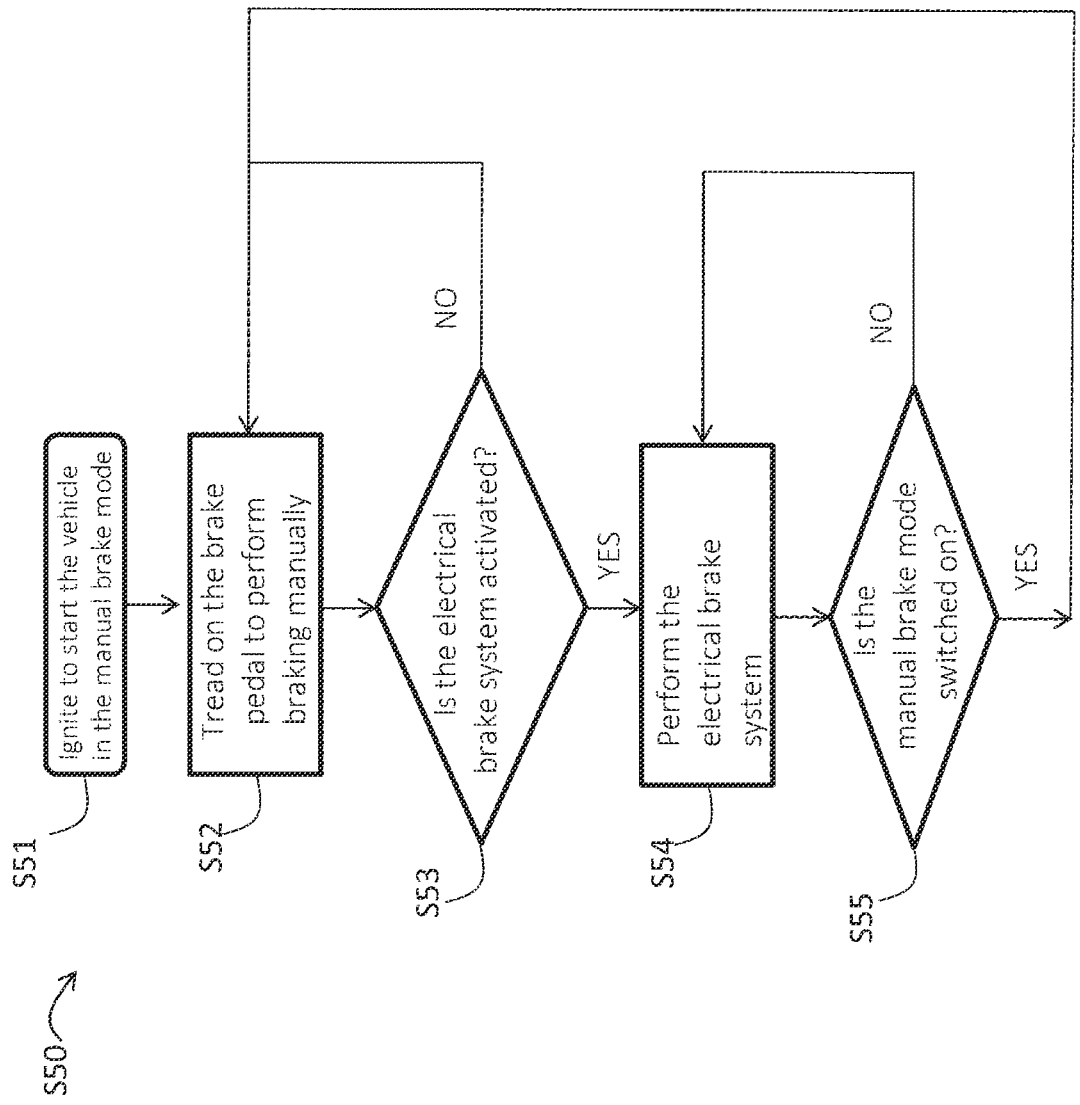
FIG. 8 is a flow diagram of the operation mode swap for the electrical brake system of the heavy vehicle in accordance with this disclosure.

FIG. 8 is a flow diagram of the operation mode swap for the electrical brake system of the heavy vehicle in accordance with this disclosure. Refer to FIG. 8, Steps S51 to S55 are included in the operation mode swap S50 for the electrical brake system of the heavy vehicles. In Step S51, the vehicle is ignited to start in the manual brake mode as an initial state. Then, in Step S52, the driver treads on the brake pedal to perform braking manually for providing a braking force. Then, in Step S53, it is determined whether or not the electrical brake system is activated by the system or by the driver. If not activated, then Step S52 is performed to operate the manual brake. If activated, then Step S54 is performed to operate the electrical brake system (the heavy vehicle brake control device 100, as shown from FIG. 1 to FIG. 5, and the heavy vehicle brake control method S100, as shown from FIG. 6 to FIG. 7). Then, in Step S55, it is determined whether or not the manual brake mode is switched on by the system, by the detected malfunction, or by the driver. If the manual brake mode is switched on, then Step S52 is performed to initiate the manual brake. If not, then perform Step S54 to operate the electrical brake system.

In summary, the heavy vehicle brake control device and the method thereof provided in this disclosure apply the electrical brake device technology of two (first and secondary) electro-pneumatic proportional valve control modules and an electronic control unit. Namely, in one embodiment, a conventional pneumatic brake system of a heavy vehicle is retrofitted with the electrical brake device, then the heavy vehicle can be thus equipped with the active or autonomous brake control. Meanwhile, the manual braking mode can be switched on to maintain the manual brake function. Thereupon, the low-cost active or autonomous brake control solution can be provided.

In addition, besides the malfunction detection mechanism of the electro-pneumatic control loop in the active or autonomous brake system, this disclosure further provides a brake-pedal cable control module as a mechanism for backing up the brake control of safety. Thus, the brake control mechanism with dual protection for pneumatic braking in this disclosure can greatly improve control safety of the pneumatic brake in the active or autonomous brake system.

While the disclosure has been disclosed by the description of this present embodiment, the embodiment does not intend to restrict or in any limit the scope of the disclosure. Additional changes and modifications made to the preferred embodiments of the disclosure will also readily appear to those skilled in the art without departing from the spirit or scope of the disclosure defined in the following claims.

What is claimed is:

1. A heavy vehicle brake control device, applied to a heavy vehicle pneumatic brake system including main parts having at least a brake valve, a front-axle air reservoir, a front-axle brake module, a rear-axle air reservoir and a rear-axle brake module, comprising:
    a first electro-pneumatic proportional valve control module; wherein a front-axle electrical brake loop of the heavy vehicle brake control device includes the front-axle air reservoir, the brake valve, the first electro-pneumatic proportional valve control module and the front-axle brake module; wherein the first electro-pneumatic proportional valve control module and the brake valve are connected between the front-axle air reservoir and the front-axle brake module, and the first electro-pneumatic proportional valve control module controls the front-axle electrical brake loop by the brake valve or the electro-pneumatic proportional valve of the first electro-pneumatic proportional valve control module;
    a secondary electro-pneumatic proportional valve control module; wherein a rear-axle electrical brake loop of the heavy vehicle brake control device includes the rear-axle air reservoir, the brake valve, the secondary electro-pneumatic proportional valve control module and the rear-axle brake module; wherein the secondary electro-pneumatic proportional valve control module and the brake valve are connected between the rear-axle air reservoir and the rear-axle brake module, and the secondary electro-pneumatic proportional valve control module controls the-rear-axle electrical brake loop by the brake valve or the electro-pneumatic proportional valve of the secondary electro-pneumatic proportional valve control module;
    a brake-pedal cable control module, connected with a brake pedal of the brake valve; and
    an electronic control unit, connected with the first electro-pneumatic proportional valve control module, the secondary electro-pneumatic proportional valve control module and the brake-pedal cable control module; wherein electronic control unit controls activation of the first electro-pneumatic proportional valve control module and the secondary electro-pneumatic proportional valve control module to perform braking along the front-axle electrical brake loop and the rear-axle electrical brake loop, respectively; wherein the electronic control unit judges a malfunction by detecting the first electro-pneumatic proportional valve control module and the secondary electro-pneumatic proportional valve control module, and determines whether the brake-pedal cable control module needs to be switched on to perform braking.

2. The heavy vehicle brake control device of claim 1, wherein each of the first electro-pneumatic proportional valve control module and the secondary electro-pneumatic proportional valve control module includes a pressure sensor, an electro-pneumatic proportional valve, a normally closed solenoid valve and a normally open solenoid valve; wherein, in each of the first electro-pneumatic proportional valve control module and the secondary electro-pneumatic proportional valve control module, each pressure sensor, each electro-pneumatic proportional valve and each normally closed solenoid valve are connected in order as an air circuit; wherein, in each of the first electro-pneumatic proportional valve control module and the secondary electro-pneumatic proportional valve control module, the inlet of each pressure sensor is a module air inlet, and each module air inlet and the brake valve are connected with the outlet of the front-axle air reservoir and the outlet of the rear-axle air reservoir, respectively; wherein, in each of the first electro-pneumatic proportional valve control module and the secondary electro-pneumatic proportional valve control module, the inlet of each normally open solenoid valve acts as a module-to-brake-valve inlet, and each the module-to-brake-valve inlet is connected with the brake valve; wherein, in each of the first electro-pneumatic proportional valve control module and the secondary electro-pneumatic proportional valve control module, the outlets of each normally closed solenoid valve and each normally open solenoid valve are connected in parallel to act as a module air outlet, and each module air outlet is connected with the front-axle brake module and the rear-axle brake module, respectively.

3. The heavy vehicle brake control device of claim 1, wherein the brake-pedal cable control module includes a drive control device, a cable and a cable reel, the cable is connected with the brake pedal of the brake valve, and the drive control device rotates and controls the cable reel to an operational rotational angle for having the cable to pull the brake pedal to reach a controlled stroke depth to perform braking.

4. A heavy vehicle brake control method, comprising the steps of:
    (1) activating two electro-pneumatic proportional valve control modules to perform braking along a front-axle electrical brake loop and a rear-axle electrical brake loop, respectively;
    (2) while the two electro-pneumatic proportional valve control modules perform braking along the front-axle electrical brake loop and the rear-axle electrical brake loop, judging malfunctions by detecting the two electro-pneumatic proportional valve control modules;
    (3) if no malfunctions are detected, the two electro-pneumatic proportional valve control modules continuing to perform braking along the front-axle electrical brake loop and the rear-axle electrical brake loop; and
    (4) if one or more malfunctions are detected, then switching on a brake-pedal cable control module to control the brake pedal of a brake valve to perform braking.

5. The heavy vehicle brake control method of claim 4, after the step (4), further including the steps of:
    (5) while the brake-pedal cable control module controls the brake pedal of the brake valve to perform braking, judging the malfunctions by detecting the brake-pedal cable control module;

(6) if none of the malfunctions is detected, the brake-pedal cable control module continuing to control the brake pedal of the brake valve to perform braking; and (7) if one or more malfunctions are detected in the brake-pedal cable control module, shutting down the brake-pedal cable control module, switching to a manual brake mode, and sending an alarm signal to remind a driver to take over the vehicle.

6. The heavy vehicle brake control method of claim 4, wherein the step (2) further includes the steps of:

(21) measuring an outlet air pressure of an air reservoir;

(22) an electronic control unit controlling a flow rate of electro-pneumatic proportional valves according to a brake command, and thus a corresponding electro-pneumatic outlet air pressure being regulated to perform electro-pneumatic braking and to derive a vehicle deceleration from vehicle speed information; and

(23) the electronic control unit comparing and evaluating the outlet air pressure of the air reservoir, a measured electro-pneumatic outlet air pressure corresponding to the flow rate, a target electro-pneumatic outlet air pressure preset by the flow rate, and a derived vehicle deceleration; if the measured electro-pneumatic outlet air pressure and the derived vehicle deceleration are determined to be abnormal, then a malfunction being determined.

* * * * *